3,354,954
STEAM INJECTION PROCESS FOR
RECOVERY OF PETROLEUM
Thomas S. Buxton, Tulsa, Okla., assignor to Pan American Petroleum Corporation, Tulsa, Okla., a corporation of Delaware
No Drawing. Filed Dec. 20, 1965, Ser. No. 515,241
6 Claims. (Cl. 166—11)

ABSTRACT OF THE DISCLOSURE

After steam breakthrough into a producing well, steam injection is temporarily halted, and heat losses from the more permeable zone will cause condensation of steam in this zone. The reduction in volume between steam and water causes oil to move from the tighter zones to fill the voids in the more permeable zones. After these are resaturated, steam injection is again resumed and continued to steam breakthrough, when the cycle can be repeated. This differs from the conventional huff-and-puff process in that the more permeable zones are used as the pressure sink instead of using the producing well as this sink.

---

This invention relates to an improved method for recovering oil from underground reservoirs by means of steam injection. More particularly it is concerned with a novel steam injection process wherein steam is introduced into the oil-bearing zone until it breaks through into the adjacent producing well or wells. Thereafter steam injection is temporarily discontinued and the producing wells are placed on production.

The existence of highly permeable zones within an oil-bearing formation limits the amount of oil that can be recovered by any conventional secondary recovery fluid injection process. When a fluid is injected into a formation of this kind, the majority of the injected fluid enters the more permeable zones, flows through these zones, bypassing the oil in the tighter or less permeable sections and eventually breaks through into the producing wells. Once this happens, the efficiency of the process is usually very low because the fluid tends to follow the path of least resistance and hence relatively little of the driving fluid spreads out into the tighter sections of the formation.

In the case of a continuous steam drive, essentially the same result occurs. The steam flows through the more permeable zones and eventually breaks through into the producing well. Thereafter, if steam injection is continued, some oil will be produced since conductive heat flow from the more permeable into the less permeable zones reduces the viscosity of the oil in the tighter sections and allows this oil to flow to the producing wells. However, with the direct steam drive much of the heat introduced into the system is withdrawn with the produced fluids, thus materially reducing the efficiency of the process.

Accordingly, it is an object of my invention to provide a novel steam injection method whereby maximum utilization of the heat in the steam is realized. It is another object of my invention to provide a steam injection process applicable to the recovery of crude oils having a wide gravity range. A further object of my invention is to provide a process whereby maximum energy from the injected steam is employed to force oil from the tighter sections of the formation to the more permeable zones thereof. It is a still further object of my invention to provide a novel method of recovering oil with steam whereby the latter is introduced into an oil-bearing formation via an injection well penetrating said formation and having one or more offset producing wells, continuing steam injection until breakthrough into at least one of said producing wells, thereafter halting steam injection and producing oil from said offset well or wells.

In carrying out an embodiment of my invention, steam is injected into the formation via a suitable injection well having one or more offset producing wells. During the injection cycle of my process, it is preferable to continue production at the producing wells. However, after steam breakthrough in the producing wells, steam injection is temporarily halted and oil is produced. Generally, substantially increased oil production rates are observed for a period of at least two weeks to one month following steam injection. At the end of this time steam injection may be resumed and the cycle repeated. Generally speaking, steam injection is discontinued until the bottom hole temperature of the producing well or wells is less than the temperature of the steam at breakthrough in the producing well(s). It should be pointed out that an improvement in oil production rate is sometimes observed even if steam injection after breakthrough is discontinued for only a short period of time, e.g., one day.

While it is to be strictly understood that I do not wish to be bound by any theory or explanation of the technical aspects of my invention, it is my belief that the increase in oil producing rate made possible by such process is obtained for the reasons which follow: When steam is injected into a formation, as previously mentioned, it tends to seek out the more permeable zones. The steam flows through these more permeable zones and eventually breaks through into a producing well leaving the less permeable zones virtually uncontacted by the injected steam. At the time of steam breakthrough the more permeable zones contain steam and the less permeable zones contain original reservoir fluids. If steam injection is discontinued at the time of steam breakthrough, heat losses from the more permeable zone, or zones, to the less permeable ones will cause the steam in the more permeable zones to condense. Since the specific volume of water is much less than that of steam—for example, water at 500° F. and 680.8 p.s.i.a. occupies only 3 percent of the volume occupied by steam under the same conditions—condensation of the steam tends to create voids within the permeable zones. The heat losses from these zones to the less permeable zones reduce the viscosity of the oil contained in the less permeable zones. To maintain an equilibrium condition in the system, the oil of reduced viscosity moves from the tighter oil-bearing sections to fill the voids in the more permeable portion of the formation. In addition to this driving force which is being exerted on the oil, a certain amount of energy causing the oil to flow into the more permeable zones may result from the light ends originally driven out of the oil by the heat from the steam. Any drop in pressure within the permeable zones tends to cause these light hydrocarbons to drive the oil into the permeable zones. This effect, of course, is accentuated when the producing well is placed on production. In some cases it may be desirable to produce from one, some, or all of the producing wells during all or part of the steam step, depending upon the extent to which heat losses are experienced via produced fluids. In any event, after steam injection is halted, resaturation of the more permeable zones with oil occurs and on resumption of steam injection, the oil that resaturated the aforesaid more permeable zones can be forced toward and into the producing wells. After steam breakthrough the cycle is repeated.

In essence, the process of my invention, after steam breakthrough, involves subjecting an oil-bearing reservoir to a series of steam pressuring and depressuring operations. In this method, depressuring is effected through the steam condensation and/or production steps with the permeable zones being used as the pressure sink.

While steam injection processes have generally been thought of as being limited to thick deposits of heavy viscous oils and tars having little or no energy, I would like to emphasize that the process of my invention can be employed to recover crude oils of much higher API gravity, e.g., 25° to 40° API. In fact, my invention is considered applicable where any conventional fluid injection secondary recovery process could ordinarily be used. This is true for the reason that in any fluid injection process, the drive fluid—gas or liquid—tends to flow more readily into the more permeable zones. This being the case, it is apparent that when practicing my invention steam condensation creates a pressure sink in said zones thus forcing the oil into and resaturating them. Also, in the case of the lighter oils, it should be pointed out that additional oil recovery can be realized, over and above that resulting from the aforesaid depressuring effects, due to the phenomenon of steam distillation which is more pronuonced in the case of the lighter crudes.

The steam temperature and pressure used in carrying out the process of my invention may vary widely. Steam generators are now in general use capable of producing steam up to pressures of 2600 p.s.i. at a temperature of about 670° F. In most instances it is unnecessary to operate at these levels, typical commercial conditions being about 550° F. and 1100 p.s.i.

The process of my invention may be further illustrated by the following specific example:

EXAMPLE

In a steam injection project conducted in the Winkleman Dome Field, located in Fremont County, Wyo., one of the wells therein was averaging 4.77 barrels of oil per day (BOPD). At the same time the average water separated from this well's production was approximately 98 percent of the total lifted liquids. Steam of 80 percent quality was injected in the formation at a depth of about 1220 feet via a nearby (125 feet) injection wells at a temperature of about 550° F. and at a pressure of 1100 p.s.i. While producing at the above-stated average, the well was shut in and steam injection halted for two days. Following this shutdown period and on resumption of steam injection, production performance of this well was substantially improved as may be seen from the following tabulations which were made for the first 23 days of September.

| Date | BOPD | BWPD | Percent H₂O |
|---|---|---|---|
| September: | | | |
| 1 | 2 | 83 | 97.6 |
| 2¹ | 3 | 122 | 97.6 |
| 3¹ | 2 | 54 | 96.4 |
| 4² | | | |
| 5 | 30 | 92 | 75.4 |
| 6 | 45 | 143 | 76.0 |
| 7 | 68 | 160 | 70.1 |
| 8 | 27 | 126 | 82.3 |
| 9 | 23 | 106 | 82.1 |
| 10 | 32 | 113 | 78.0 |
| 11 | 33 | 118 | 78.0 |
| 12 | 38 | 154 | 80.0 |
| 13 | 44 | 131 | 75.0 |
| 14 | 48 | 145 | 75.0 |
| 15 | 34 | 136 | 80.0 |
| 16 | 21 | 119 | 85.0 |
| 17 | 12 | 104 | 89.5 |
| 18 | 15 | 88 | 85.2 |
| 19 | 15 | 85 | 85.0 |
| 20 | 17 | 78 | 82.2 |
| 21 | 14 | 58 | 80.5 |
| 22 | 23 | 93 | 80.0 |
| 23 | 15 | 60 | 80.0 |

¹ No steam injection.
² No data taken.

It is apparent from the above data that the daily oil production from this well increased substantially and that the water cut decreased subsequent to the shutdown period. Temperature surveys run before and after the steam injection shutdown gave the following maximum well temperatures:

| Date: | Temp., ° F. |
|---|---|
| August 25 | 260 |
| September 10 | 224 |
| September 22 | 180 |

Prior to shutdown of steam injection, steam entered the producing well from the more permeable zones in the formation concerned. After shutdown and after rendering these zones less permeable to steam by the presence of oil and steam condensate in said zones, the newly injected steam was forced—at least in part—to go into the tighter sections which then had a higher relative permeability to steam than the zones which it originally entered. This is indicated because the maximum well temperatures on September 10 and 22—after steam injection had resumed—were considerably cooler than that recorded on August 25, showing that steam was now moving into zones where it had not entered before and that the direct communication between injection well and producing well through the formerly more permeable zone did not exist.

It will be apparent from the foregoing description that the process of my invention is subject to numerous modifications without departing from the scope thereof as indicated by the accompanying claims. Accordingly, it is to be understood that the process of my invention is considered to encompass any steam injection method for the recovery of petroleum from an underground reservoir thereof wherein steam is injected into a petroleum-bearing reservoir via one or more injection wells, allowed to condense therein and thereafter petroleum recovered therefrom by means of one or more offset producing wells.

What I claim is:

1. In a method for recovering petroleum from an underground deposit thereof, said deposit being penetrated by an injection well and a producing well, the improvement which comprises injecting steam into said deposit via said injection well until it breaks through into said producing well, and thereafter discontinuing the introduction of said steam until the bottom hole temperature in said producing well is below the temperature of said steam at breakthrough into said producing well to permit said steam to condense in the more permeable zones of said deposit, producing hot fluids containing petroleum from said producing well and repeating the above cycle.

2. The method of claim 1 in which hot fluids containing petroleum are recovered from said producing well during the steam injection step.

3. The method of claim 1 in which production of hot petroleum-containing fluids from said producing well is discontinued during the steam injection step.

4. The method of claim 1 in which said deposit consists essentially of tar sand.

5. The method of claim 1 in which said deposit consists essentially of heavy oil having a gravity of not more than about 25° API.

6. The method of claim 1 wherein the recovered petroleum has a gravity ranging from about 25° to 40° API.

References Cited

UNITED STATES PATENTS

| 2,910,123 | 10/1959 | Elkins et al. | 166—11 X |
| 3,126,961 | 3/1964 | Craig et al. | 166—40 |
| 3,155,160 | 11/1964 | Craig et al. | 166—40 |
| 3,193,009 | 7/1965 | Wallace et al. | 166—40 X |
| 3,221,813 | 12/1965 | Closmann et al. | 166—40 X |
| 3,251,412 | 5/1966 | Cooke et al. | 166—9 |
| 3,279,538 | 10/1966 | Doscher | 166—11 |

FOREIGN PATENTS 511,768  8/1939  Great Britain.

STEPHEN J. NOVOSAD, *Primary Examiner.*